(12) United States Patent  
Tsuchiya et al.

(10) Patent No.: US 9,810,136 B2  
(45) Date of Patent: Nov. 7, 2017

(54) COOLANT-CONTROL VALVE

(71) Applicant: MIKUNI CORPORATION, Tokyo (JP)

(72) Inventors: Toru Tsuchiya, Odawara (JP); Takumi Oikawa, Odawara (JP); Yoshiyuki Kanesaka, Odawara (JP); Satoshi Ando, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 210 days.

(21) Appl. No.: 14/556,532

(22) Filed: Dec. 1, 2014

(65) Prior Publication Data

US 2015/0083057 A1   Mar. 26, 2015

Related U.S. Application Data

(63) Continuation of application No. PCT/JP2013/065236, filed on May 31, 2013.

(30) Foreign Application Priority Data

Jun. 1, 2012  (JP) .................................. 2012-126448

(51) Int. Cl.
 *F01P 7/14* (2006.01)
 *F01P 11/14* (2006.01)
 (Continued)

(52) U.S. Cl.
 CPC ................. *F01P 7/14* (2013.01); *F01P 11/14* (2013.01); *F16K 3/24* (2013.01); *F16K 11/0853* (2013.01);
 (Continued)

(58) Field of Classification Search
 CPC ...... F01P 7/16; F01P 7/14; F01P 7/167; F01P 2007/146; F01P 3/20
 (Continued)

(56) References Cited

U.S. PATENT DOCUMENTS 5,979,373 A * 11/1999 Sano ....................... F01P 7/167  
 123/41.08  
6,659,050 B1 * 12/2003 Creech ................... F01P 7/167  
 123/41.08  
2004/0060541 A1   4/2004 Soshino et al.

FOREIGN PATENT DOCUMENTS

EP  1 342 891 A2  9/2003  
FR  2 901 004     11/2007  
 (Continued)

OTHER PUBLICATIONS

International Search Report mailed Aug. 13, 2013, in corresponding International Patent Application No. PCT/JP2013/065236.

(Continued)

*Primary Examiner* — Jacob Amick  
*Assistant Examiner* — Charles Brauch

(57) ABSTRACT

A coolant-control valve that performs initialization learning using a stopper and provides an efficient structure by an initialization learning stopper within an actuator which drives a valve body. The coolant-control valve is equipped with a rotor driven to control a flow rate of coolant for cooling an engine, a casing that houses the rotor, and a rotary drive device that drives the rotor. Control means of the rotary drive device have an initialization learning function of an operating range of the rotor. The rotary drive device is equipped with a motor and a reduction gear. The operating range of the rotor is restricted by the operating range of an output gear among power transmission elements in the reduction gear. A groove of the output gear and a fixed-angle stopper inserted into the groove are restricting means for use during initialization learning by the control means.

7 Claims, 4 Drawing Sheets

(51) Int. Cl.
*F16K 11/085* (2006.01)
*F16K 31/04* (2006.01)
*F16K 3/24* (2006.01)
*F01P 7/16* (2006.01)
*F01P 3/20* (2006.01)

(52) U.S. Cl.
CPC .......... *F16K 31/041* (2013.01); *F16K 31/043* (2013.01); *F01P 3/20* (2013.01); *F01P 7/16* (2013.01); *F01P 7/167* (2013.01); *F01P 2007/146* (2013.01)

(58) Field of Classification Search
USPC ...................................................... 123/41.08
See application file for complete search history.

(56) References Cited

FOREIGN PATENT DOCUMENTS

| | | |
|---|---|---|
| JP | 2002-98245 | 4/2002 |
| JP | 2004-108343 | 4/2004 |
| JP | 2005-133624 | 5/2005 |

OTHER PUBLICATIONS

Extended European Search Report dated Mar. 22, 2016 in corresponding European Patent Application No. 13796759.2.

* cited by examiner

COOLANT-CONTROL VALVE

CROSS-REFERENCE TO RELATED APPLICATION(S)

This application is a continuation application, filed under 35 U.S.C. §111(a), of International Application PCT/JP2013/065236, filed on May 31, 2013, which claims the foreign priority benefit of Japanese Patent Application No. 2012-126448, filed Jun. 1, 2012, the disclosures of which are incorporated herein by reference.

BACKGROUND

1. Field

Embodiments of the present invention relate to a coolant-control valve that controls the flow of coolant of an engine.

2. Description of Related Art

In an engine (internal combustion engine) of a vehicle such as an automobile, a technique has been studied in which, for the purpose of improvement in warming-up performance of the engine and improvement in fuel efficiency due to operation of the engine at an optimum temperature, apart from a main flow passage that circulates the coolant between the engine and a radiator, a bypass flow passage configured to directly return the coolant to the engine by bypassing the radiator is provided, and a coolant-control valve is provided in the main flow passage to adjust a degree of opening of the coolant-control valve depending on a coolant temperature and other values, thereby controlling an amount of coolant that flows through the main flow passage and is cooled by the radiator. In addition, the coolant is circulated by a pump that is driven by the engine. During operation of the engine, and when the coolant-control valve is open, the coolant mainly circulates in the main flow passage, and when the coolant-control valve is closed, the coolant circulates in the bypass flow passage.

For example, when starting up the engine in which the coolant temperature is low, the coolant is directly returned to the engine from the bypass flow passage without passing through the radiator by blocking the main flow passage, thereby promoting the warming-up of the engine. Furthermore, for example, in order to control the temperature of the coolant to optimize the combustion of fuel in the engine even after warming-up, opening and closing (degree of opening) of the coolant-control valve is adjusted.

In such a coolant-control valve, the use of a rotary type valve or the like has been studied.

In the rotary type valve, for example, a flow passage is provided in the rotor, and an opening portion is formed in a housing that houses the rotor. The opening portion is connected to an external flow passage, and communicates with the flow passage in the rotor in the case of an angle in which an angle of the rotor is open. The coolant-control valve is open and closed by a rotational angle of the rotor, and the degree of opening is adjusted to adjust the flow rate.

Thus, for example, during assembly of the coolant-control valve, at the time of start of operation of the coolant-control valve after completion, there is a need for initialization learning of angle of a fully-closed position and a fully-open position. For example, a technique has been suggested in which, in a cooling system controller of an engine that adjusts engine water temperature, with respect to a thermo valve, a heater valve, and an oil valve, the initial process of changing the valve from a fully-open state to a fully-closed state is performed at the time of start of electric conduction (for example, refer to Patent Literature 1).

Furthermore, although it does not relate to the initialization learning, for example, a technique has been suggested in which, in a flow rate control valve for controlling the engine coolant, the valve opening is restricted by a mechanical stopper to prevent an occurrence of inconvenience of a valve at the time of malfunction or the like (for example, refer to Patent Literature 2).

3. Patent Literature

Patent Literature 1: Japanese Publication No. 2007-23989 W

Patent Literature 2: Japanese Publication No. 2002-98245 W

SUMMARY

However, in general, in the initialization learning, for example, it may be preferred to provide a mechanical stopper in response to each position such as an origin position and a maximum movement position to learn a position when coming into contact with the stopper. However, an initialization learning stopper has not been provided in the coolant-control valve.

For example, Patent Literature 1 describes a technique that performs the initialization process in the valve of the cooling system controller of the engine, but does not describe a mechanical stopper for positioning during the initialization process.

Furthermore, Patent Literature 2 has a structure in which, within a rotating range of the rotor (valve body) that eccentrically rotates, there is a portion in which the eccentric rotor comes into contact with a member of a valve seat side, and when the rotor excessively rotates by malfunction of the drive device, the rotor is pressed against the member of the valve seat side, which becomes a factor of failure of the coolant-control valve.

Therefore, in Patent Literature 2, the rotating range of the rotor is restricted by a stopper so that the valve body (rotor) does not come into contact with the member of the valve seat side, but it does not describe initialization. That is, since Patent Literature 2 has a configuration that causes a failure when the valve body excessively rotates, a stopper is provided to prevent the failure caused by over-rotation, but the stopper of initialization learning is not known.

Furthermore, in Patent Literature 2, the stopper is equipped with a stopper of a moving side that is provided on an output shaft of a reduction gear connected to a valve body to rotate the valve body, and a stopper of a fixed side that is provided in a member fixed to the valve housing, so that further rotation of the valve body is adapted to be restricted when both the stoppers come into contact with each other, but there is a concern that these stoppers hinder reduction of size and manufacturing cost of the valve.

For example, in the configuration in which the stopper is provided on the output shaft, since stress may act on a small-diameter portion such as an output shaft in the device, there is a need for a configuration that increases yield strength of the portion provided with the stopper, and there is a concern that it is necessary to increase the size as a configuration that increases the yield strength.

In the case of providing a stopper on the valve body (rotor) connected to the output shaft, a rigid portion is required for a portion provided with the stopper of the valve body, there is a concern that a large load is applied to the rotation shaft of the valve body, and in some cases, there is a need for high strength of the rotation shaft.

Furthermore, in a case where the housing containing the valve and an actuator (housing of the actuator) are separated from each other, if there is a stopper on the rotor side, when the rotation of the valve body is restricted by the stopper, since twisted force occurs between the housing of the valve body and the actuator, it is necessary to strengthen the joint between the housing of the valve body and the actuator.

There is a concern that these cause an increase in manufacturing cost.

Embodiments of the present invention have been made in view of the above-described circumstances, and an object thereof is to provide a coolant-control valve that is able to perform the initialization learning using a stopper and to provide an efficient structure, by providing an initialization learning stopper in an actuator which drives a valve body.

To achieve the above object, a coolant-control valve includes: a valve body that is driven to control a flow rate of coolant for cooling an engine, the valve body being operated to control flow of coolant; a casing that houses the valve body; an actuator that drives the valve body and that includes a motor and a reduction gear that decelerates rotation of the motor; control means that controls the actuator and that has an initialization learning function of an operating range of the valve body; and restricting means that regulates the operating range of the valve body, by restricting the operating range of at least one power transmission element except an output shaft configured to transmit power to the valve body among power transmission elements provided in the reduction gear, and used for specifying the operating range of the valve body that is learned during initialization learning using the control means.

According to such a configuration, since the restricting means for restricting the operating range of the power transmission element in the reduction gear of the actuator is provided, a size reduction and a cost reduction are facilitated compared to a case where the restricting means is provided on the valve body and the casing side.

For example, by providing the restricting means in the actuator, even in a configuration in which the casing side of the valve body and the actuator are connected to each other, since force acts on the restricting means within the actuator, the twisted force does not act between the casing and the actuator, and there is no need to reinforce the joint between the casing and the actuator.

Furthermore, when the restricting means is provided in the valve body or the output shaft, there is a concern that the rigid portion (high-strength portion) may be provided in the valve body, and the high strength of the output shaft may be required. However, if it is configured to provide the restricting means in one of the power transmission elements other than the output shaft of the reduction gear, there is a high possibility that power transmission element may have a high strength, there is no need to provide the rigid portion or enhance the strength, and the simplification is possible.

Furthermore, the configuration required for the initialization learning is completed within the actuator, which makes it possible to simplify the coolant-control valve.

In the above-described configuration of the present invention, it may be preferable that the actuator rotationally operate the valve body, and the power transmission element of which the operating range is restricted by the restricting means be an output gear that rotates the valve body via the output shaft.

According to such a configuration, for example, it is possible to dispose a member serving as the restricting means on the rotating output gear side, and in a fixed member such as a body of the actuator, respectively, thereby making it possible to allow the output gear to rotate by a predetermined rotation angular range as the operating range.

Here, there is a high possibility that the output gear of the reduction gear has high rigidity and a large diameter for deceleration. For example, in the case of a configuration in which a stopper on the movable side abutting against the stopper of the fixed side is provided as the restricting means in the output gear, since it is possible to provide a stopper in a portion having high strength and a relatively large diameter, there is no need to necessarily provide a rigid portion in a portion formed with the stopper of the output gear or to reinforce the rotation shaft, and there is a possibility that it can be manufactured at low cost.

In the above-described configuration, it may be preferable that the restricting means include an arch-shaped groove that is provided in the output gear and centered on the rotation center of the output gear, and an angle stopper that is inserted into the groove and fixed to the rotating output gear, and the rotational angle range of the output gear be restricted by abutment of the angle stopper against each of both end portions of the groove.

According to such a configuration, it is possible to dispose the restricting means within the range of the diameter of the output gear and within the range of thickness of the output gear, and even if the restricting means is provided, the size of the actuator does not increase. Furthermore, even as a structure that reinforces the groove, the size hardly changes, and the restricting means does not hinder the size reduction of the coolant-control valve.

According to embodiments of the present invention, it is possible to regulate the operating range of the valve body by restricting the operating range of the power transmission element on the reduction gear side of the actuator, and it is possible to allow the initialization learning of the operating range of the valve body of the coolant-control valve, based on the restricted operating range. At this time, when the restricting means is provided, the simple and efficient structure can be provided without requiring reinforcement of the structure and enlargement of the size.

BRIEF DESCRIPTION OF DRAWINGS

These and/or other aspects and advantages will become apparent and more readily appreciated from the following description of the embodiments, taken in conjunction with the accompanying drawings of which.

DESCRIPTION OF EMBODIMENTS

Hereinafter, preferred embodiments of the present invention will be described with reference to the drawings.

For example, a rotary type valve is used to control the coolant of an engine of a vehicle, is used by being attached to an engine block of the engine, and is used to open and close a main flow passage and a sub flow passage, in an engine cooling system that has the main flow passage for circulating the coolant between an engine block and a radiator, the sub flow passage for supplying the coolant to a device requiring temperature adjustment using the coolant (for example, a heater or a throttle), and a bypass flow passage that bypasses the radiator.

Figure 1:
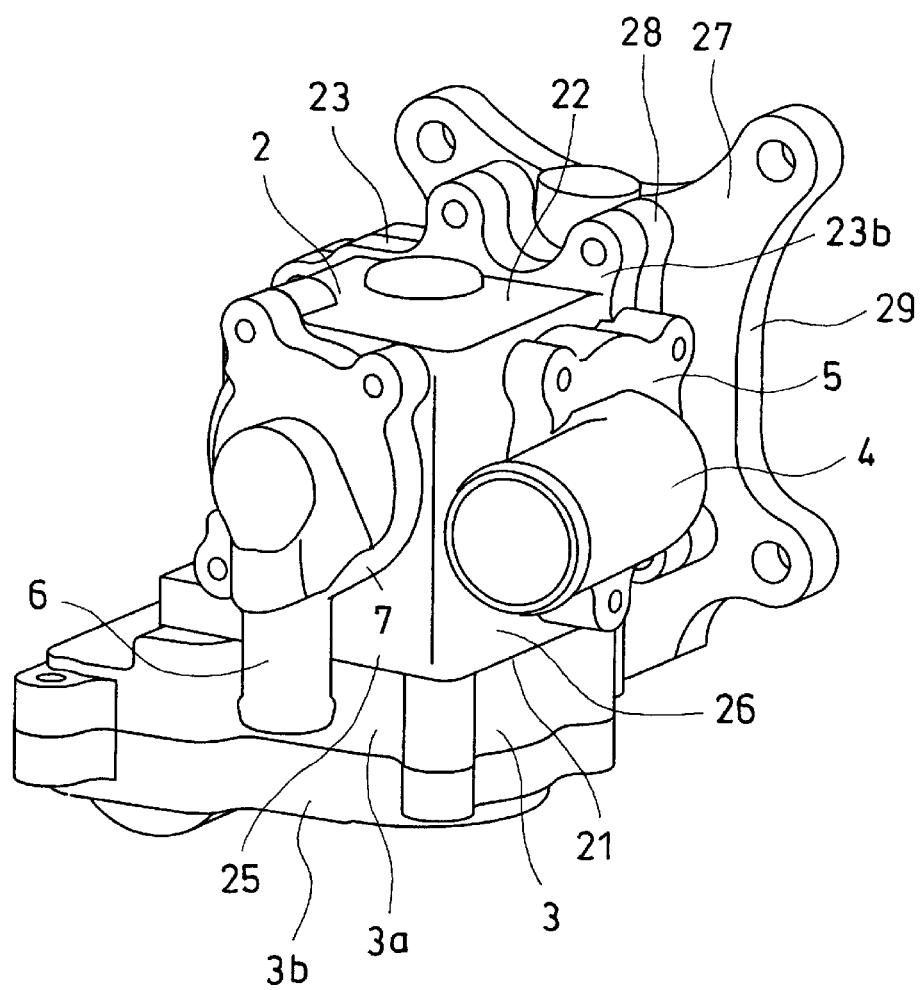
FIG. 1 is a perspective view illustrating a coolant-control valve of an embodiment.
Figure 2:
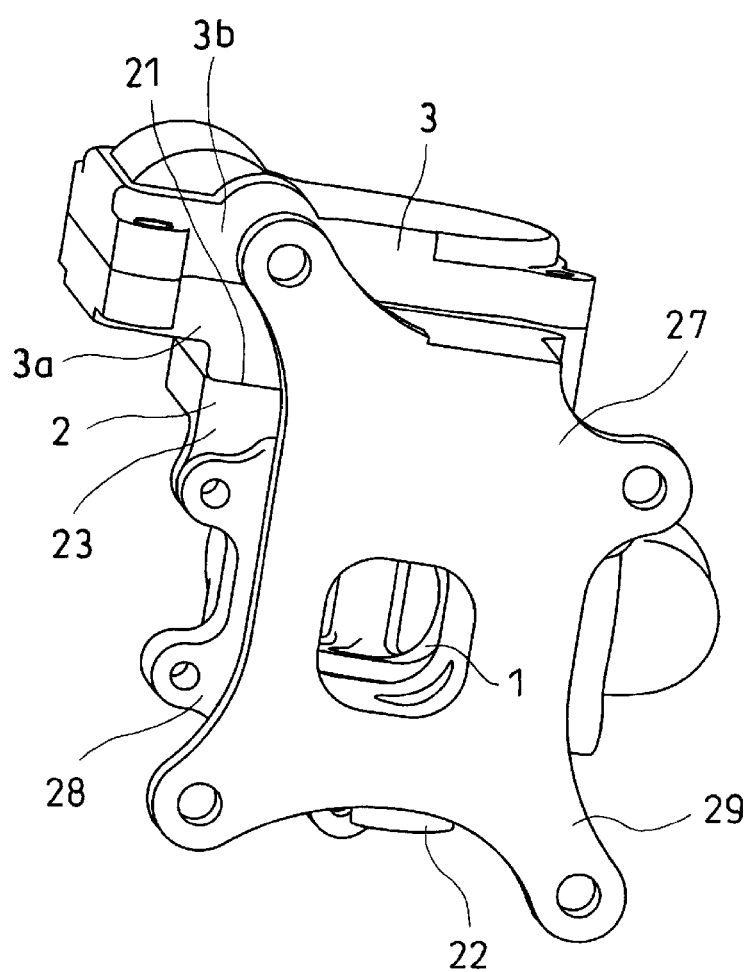
FIG. 2 is a perspective view illustrating the coolant-control valve.
Figure 3:
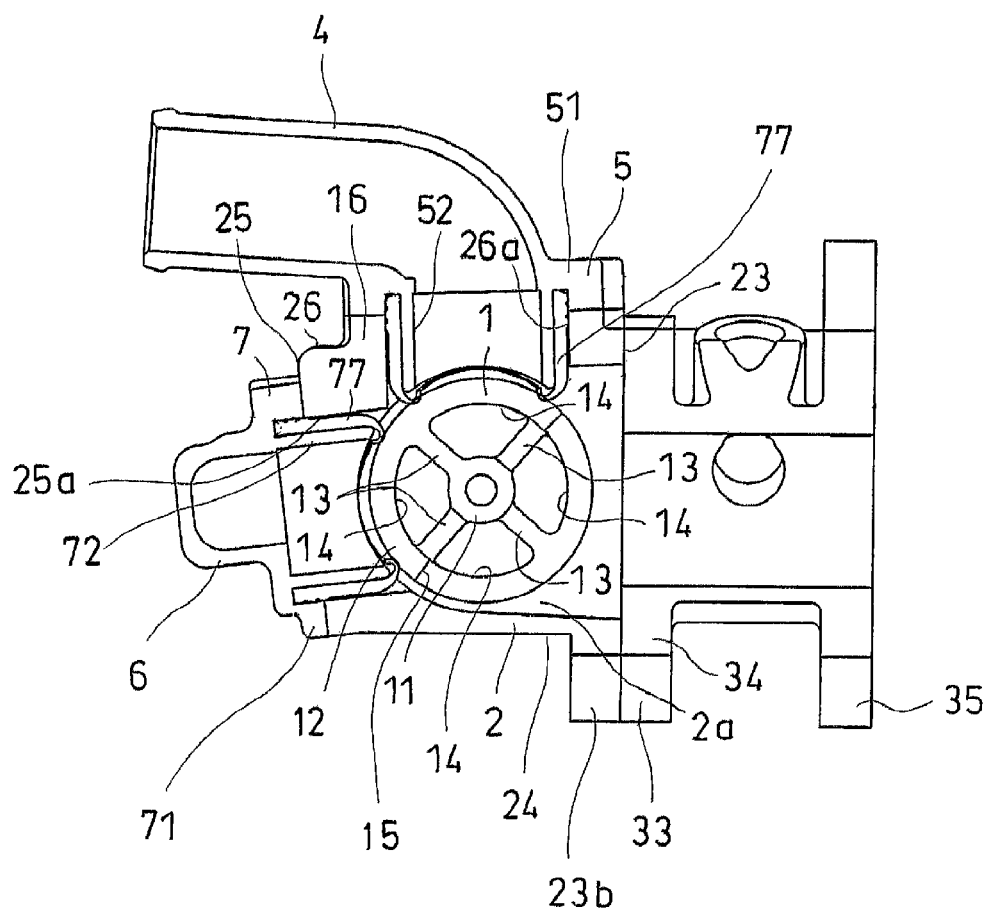
FIG. 3 is a partially cutaway perspective view illustrating the coolant-control valve.

As illustrated in FIGS. 1 to 3, a rotary type valve has a rotor 1 (illustrated in FIG. 3), a casing 2 that houses the rotor 1 in a freely rotatable manner, a rotary drive device (actuator) 3 that rotationally drives the rotor 1, a main connecting member 5 having a main connecting pipe 4 that is connected to a main flow passage to perform outflow (or inflow) of the coolant (fluid), and a sub connecting member 7 having a sub connecting pipe 6 that is connected to a sub flow passage to perform outflow (or inflow) of the coolant.

The rotor 1 is equipped with an elongated cylindrical rotation shaft 11, a cylindrical portion 12 formed in a thick cylindrical shape centered on a center axis of the rotation shaft 11, and a spoke portion 13 having a shape that extends in all directions from the rotation shaft 11 along a radial direction of the cylindrical portion 12 at both end portions in an axial direction of the cylindrical portion 12 and is connected to the cylindrical portion 12. In addition, the spoke portion 13 is not limited to the shape that extends in all directions (four directions), and the extending direction may be, for example, two directions, three directions, four directions or more.

Since the left and right end surface portions of the rotor 1 includes the spoke portions 13 having a shape extending in four directions from the above-described rotation shaft 11, a part between the portions extending in four directions is an opening. Therefore, on the left and right end surfaces of the rotor 1, four openings (end surface side openings) 14 are each provided, and an area occupied by the opening 14 is greater than an area occupied by the spoke portions 13 of the end surface of the rotor 1.

In addition, the ends of the rotation shaft 11 protrude from both end surfaces of the rotor 1, respectively.

On an outer circumferential surface of the rotor 1 (cylindrical portion 12), a rotor opening portion 15 having a circumferential length of approximately half of the outer circumferential surface (slightly shorter than the half) is provided. Both end portions in the circumferential direction of the rotor opening portion 15 are formed in a semicircular shape. Furthermore, the length of the width along the axial direction of the rotor 1 of the rotor opening portion 15 is ½ or more, for example, ⅔ or more of the length along the axial direction of the rotor 1.

Furthermore, the rotor opening portion 15 of the outer circumferential surface of the rotor 1 is provided on the cylindrical portion 12 of the rotor 1 and is in a state of allowing the interior and the exterior of the rotor 1 (cylindrical portion 12) to communicate with each other through the cylindrical portion 12.

Furthermore, the portion except the rotor opening portion 15 of the outer circumferential surface of the rotor 1 (cylindrical portion 12) is a rotor outer circumference blocking surface 16 as an outer circumferential surface having no opening. Here, the length of the rotor opening portion 15 along the circumferential direction of the outer circumferential surface of the rotor 1 is substantially half of the length of the entire circumference. In contrast, the rotor outer circumference blocking surface 16 having no opening is substantially half of the length of the rotor 1 along the circumferential direction of the outer circumferential surface.

The casing 2 is formed in an approximately hexahedral (rectangular) box shape. In addition, the shape of the casing 2 is not limited to the approximately hexahedron, and it may have a shape that surrounds the outer circumferential surface of the rotor 1, and for example, a substantially cylindrical shape or the like. In the interior of the casing 2, a rotor housing space 2a (illustrated in FIG. 3) for rotatably housing the rotor 1 is formed. Two surfaces facing each other of the six sides of the casing 2 have an inner surface that faces the end surface of the rotor 1, and the remaining four sides have an inner surface that faces the outer circumferential surface of the rotor. Here, plate-shaped portions constituting each side of the hexahedron are a first plate-shaped portion 21 to a sixth plate-shaped portion 26.

The plate-shaped portion having an inner surface facing the end surface of the rotor 1 is set to the first plate-shaped portion 21 and a second plate-shaped portion 22, and the plate-shaped portions having an inner surface facing the outer circumferential surface of the rotor 1 are set to a third plate-shaped portion 23 to the sixth plate-shaped portion 26.

Figure 4:
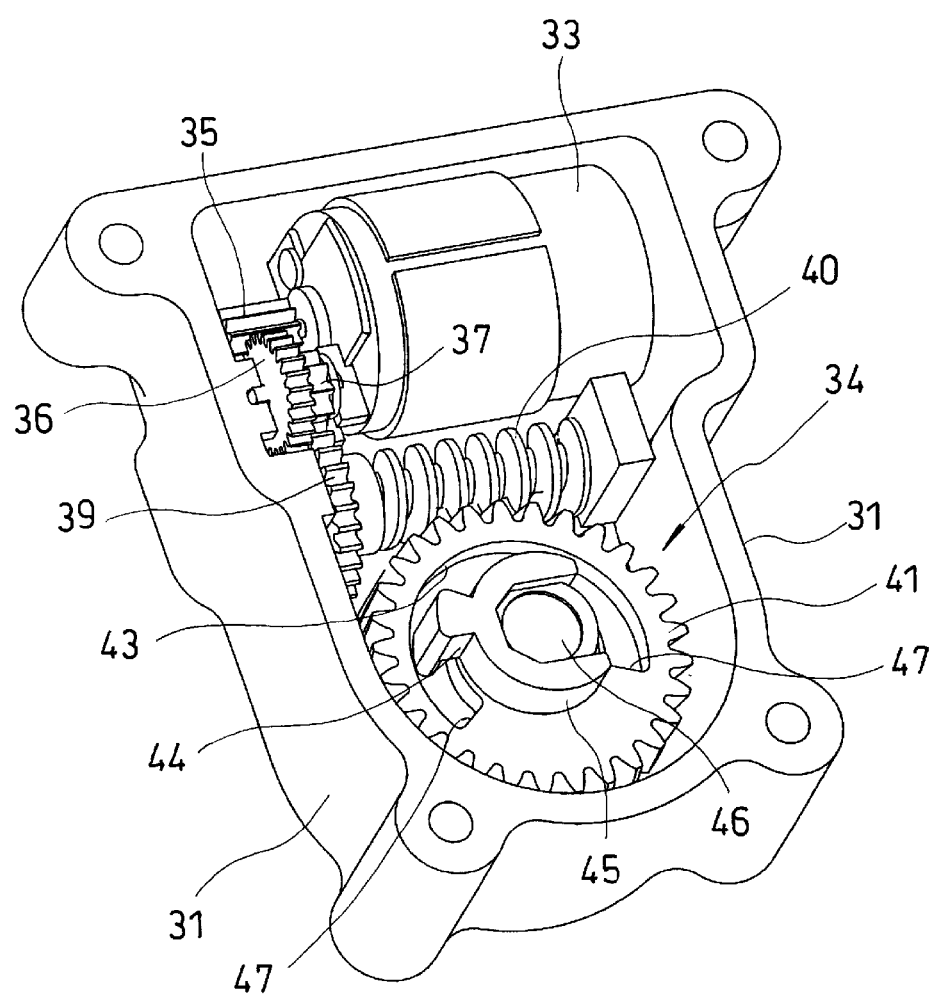
FIG. 4 is a perspective view illustrating an actuator that drives the coolant-control valve, in a state in which a cover is removed.

The rotary drive device 3 is adapted to be attached to the first plate-shaped portion 21 of one of the first plate-shaped portion 21 and the second plate-shaped portion 22. The first plate-shaped portion 21 is provided with a hole into which the rotor 1 can be inserted. Although it is not illustrated, the hole is closed by a cover member. Furthermore, the output shaft 46 (a base end portion is illustrated in FIG. 4) of the rotary drive device 3 passes through the cover member in a sealed state, and a leading end of the output shaft 46 is adapted to be connected to the rotor 1 to rotate the rotor 1.

The rotary drive device 3 is housed in a body including a main body 31 and the cover 32, and a motor 33 configured to rotate, for example, the output shaft is provided inside the body. The output shaft 46 is connected to the motor 33 via the reduction gear 34. A leading end portion of the output shaft 46 (a base end is illustrated in FIG. 4) is connected to one end portion of the rotation shaft 11 of the rotor 1. The other end portion of the rotation shaft 11 is rotatably supported by a bearing portion (not illustrated) of the second plate-shaped portion 22. In addition, the details of the rotary drive device 3 will be described later.

The third plate-shaped portion 23 having the inner surface facing the outer circumferential surface of the rotor 1 is provided so that the outer circumferential portion thereof extends outward in a flange shape and is formed as a flange portion 23b, but a portion surrounded by the first plate-shaped portion 21, the second plate-shaped portion 22, the fourth plate-shaped portion 24, and the sixth plate-shaped portion 26 is an opening portion.

In addition, the flange portion 23b is attached to an attachment position having the opening of the engine block of the engine via a connecting member 27. The connecting member 27 is a tubular member, a flange portion 28 connected to the flange portion 23b is provided on the opening side of one end portion, and a flange portion 29 connected to the engine block is provided on the other opening side. The rotary type valve is connected to the engine block via the connecting member 27.

In the third plate-shaped portion 23 to which the connecting member 27 is connected, an opening is formed as described above so that the coolant can flow in from the engine block side via the connecting member 27.

The above-described sub connecting member 7 is attached to the outer surface of the fifth plate-shaped portion 25. The fifth plate-shaped portion 25 is provided with an opening portion 25a that communicates with the sub connecting pipe 6 of the sub connecting member 7.

The opening portion 25a is an opening portion 25a of an outflow side that allows the coolant to flow out to the outside from the rotary type valve. The coolant, for example, which has flowed from the opening portion 25a, is circulated through the sub flow passage (for example, including a heater or the like) and is returned to the engine block from the pump.

The fifth plate-shaped portion 25 is disposed substantially parallel to face the third plate-shaped portion 23 having an opening portion 23a of an inflow side (or an outflow side), and is disposed substantially at a right angle to the sixth plate-shaped portion 26 and the fourth plate-shaped portion 24.

The opening portion 25a has a cylindrical inner peripheral surface.

The sub connecting member 7 has a plate-shaped connecting portion 71, and a cylindrical support pipe portion 72 that extends in a state of being inserted into the opening portion 25a from the connecting portion 71. The connecting portion 71 of the sub connecting member 7 is formed with a through hole, and the through hole communicates with the interior of the support pipe portion 72 on the inner surface side of the connecting portion 71, and communicates with the interior of the sub connecting pipe 6 on the outer surface side thereof. Thus, the support pipe portion 72 is in communication with the sub connecting pipe 6.

In addition, the inner surface of the connecting portion 71 is adapted to come into surface-contact with the outer surface of the opening portion 25a of the fifth plate-shaped portion 25, and the opening portion 25a is in a state of being closed when the sub connecting member 7 is connected to the casing 2, but the opening portion 25a is in communication with the sub connecting pipe 6 via the support pipe portion 72.

The support pipe portion 72 is provided with a cylindrical seal member 77 to cover the outer circumference thereof. That is, the support pipe portion 72 is inserted into the cylindrical seal member 77. A cylindrical leading end portion of the seal member 77 along the outer circumferential surface of the rotor 1 comes into surface-contact with the outer circumferential surface of the rotor 1. In the state in which the leading end portion of the seal member 77 comes into contact with the rotor outer circumference blocking surface 16 of the rotor 1, the leading end side opening portion of the cylindrical seal member 77 is in a state of being completely blocked. At this time, the support pipe portion 72 is in a blocked state, and the sub connecting pipe 6 is in a blocked state.

Furthermore, when the rotor opening portion 15 overlaps the leading end portion of the seal member 77, the valve is in an open state, which causes a state in which the coolant flowing from the opening portion of the third plate-shaped portion 23 can be allowed to flow out to the sub-passage side from the engine block side via the inner space of the rotor 1.

In addition, a degree of valve opening of the rotor opening portion 15 is adjusted by the overlap ratio of the leading end portion (leading end opening portion) of the seal member 77, which makes it possible to adjust the flow rate.

However, the rotor opening portion 15 has a shape in which the sub-passage opening portion and a main flow passage opening portion to be described below are integrated to each other in the circumferential direction, and the length of the rotor opening portion 15 in the circumferential direction of the rotor 1 is longer than the diameter of the portion of the seal member 77 coming into contact with the rotor 1.

The above-described main connecting member 5 is attached the outer surface of the sixth plate-shaped portion 26. The sixth plate-shaped portion 26 is provided with an opening portion (casing opening portion) 26a that communicates with the main connecting pipe 4 of the main connecting member 5.

The opening portion 26a is an opening portion 26a of an outflow side (or an inflow side) that allows the coolant to flow out to the outside from the rotary type valve. The coolant, for example, which has flowed out of the opening portion 26a, is circulated through the main flow passage. The coolant is returned to the engine block from the pump via the radiator.

The sixth plate-shaped portion 26 is disposed substantially at a right angle to the third plate-shaped portion 23 having the opening portion 23a of the inflow side (or the outflow side) and the fifth plate-shaped portion 25.

The opening portion 26a has a cylindrical inner peripheral surface.

The main connecting member 5 is equipped with a plate-shaped connecting portion 51, and a cylindrical support pipe portion 52 that extends in a state of being inserted into the opening portion 26a from the connecting portion 51. The connecting portion 51 of the main connecting member 5 is formed with a through hole, the through hole communicates with the interior of the support pipe portion 52 on the inner surface side of the connecting portion 51, and communicates with the interior of the main connecting pipe 4 on the outer surface side thereof. Thus, the support pipe portion 52 and the main connecting pipe 4 communicate with each other.

In addition, the inner surface of the connecting portion 51 is adapted to come into surface-contact with the outer surface of the opening portion 26a of the sixth plate-shaped portion 26, and the opening portion 26a is in a blocked state when the main connecting member 5 is connected to the casing 2, but the opening portion 26a is in communication with the sub connecting pipe 6 via the support pipe portion 52.

In addition, the sub connecting member 7 is different from the main connecting member 5 in structure depending on a situation whether either the sub connecting pipe 6 or the main connecting pipe 4 is provided, the shapes of the inner surface sides of the connecting portions 51 and 71 are substantially the same, and the support pipe portion 72 and support pipe portion 52 have the same shape.

The support pipe portion 52 is provided with a cylindrical seal member 77 to cover the outer circumference thereof. That is, the support pipe portion 52 is inserted into the cylindrical seal member 77. The seal member 77 is similar to the seal member 77 of the above-described sub connecting member 7 side, has a similar shape, and has a similar function.

In the coolant-control valve, the rotor 1 is provided with the rotor opening portion 15 that is long in the circumferential direction capable of opening both of two opening portions 25a and 26a of the casing 2 side, as described above.

The rotor 1 is provided with the main opening portion 26a communicating with the main connecting pipe 4, and the sub opening portion 25a communicating with the sub connecting pipe 6, and is rotatable to a fully-open state of opening both opening portions 25a and 26a from a fully-closed state of blocking both opening portions.

As illustrated in FIG. 4, the rotary drive device 3 that rotationally drives the rotor 1 is constituted by the motor 33 and the reduction gear 34.

The reduction gear 34 is equipped with a first spur gear 35 provided on the rotation shaft of the motor 33, a third spur gear 37 that is disposed coaxially with a second spur gear 36 meshed with the first spur gear 35 and is provided to rotate integrally, a fourth spur gear 39 meshed with the third spur gear 37, a fifth screw gear 40 that is disposed coaxially with the fourth spur gear 39 and is provided to rotate integrally, and an output gear 41 as a sixth helical gear (worm wheel) meshed with the fifth screw gear (warm) 40.

The rotation of the motor 33 is adapted to be decelerated by meshing sections of each gear. Furthermore, the rotation of the motor 33 is adapted to be decelerated by the worm gear that is constituted by the fifth screw gear 40 and the output gear 41 as the sixth helical gear.

The output gear 41 is a gear having the largest diameter among the gear mechanisms of the reduction gear 34, the output shaft 46 connected to the rotor 1 to integrally rotate the rotor 1 is coaxially fixed, and the output gear 41 is adapted to rotate integrally with the output shaft 46. In addition, in FIG. 4, the base end portion side of the output shaft 46 is illustrated, and the leading end portion connected to the rotation shaft 11 of the rotor 1 extends to the rotor 1 side from the back side of the main body 31.

The output gear 41 is provided with an arc-shaped groove 43 centered on the rotation center of the output gear 41. Furthermore, on the cover 32 side of the body of the rotary drive device 3, an angle stopper 44 in a state of being inserted into the arc-shaped groove 43 is provided at a predetermined position. In addition, in FIG. 4, the cover 32 is not illustrated (illustrated in FIG. 1), and a portion projecting from the inner surface of the cover 32 is illustrated.

Further, both end portions of the groove 43 of the output gear 41 are abutting portions 47 against which the angle stopper 44 abuts when the output gear 41 is rotated to each of the right and left sides. The angle stopper 44, and the groove 43 of the output gear 41 having the abutting portions 47 at both ends thereof are restricting means provided on the power transmission element, except the power transmission element (the output shaft 46) that is directly connected to the rotor 1 as the valve body of the reduction gear to transmit power to the rotor 1.

Furthermore, the angle stopper 44 is provided on the cover 32 integrally with a bearing portion 45 having an arch shape that is larger than a semicircle. The bearing portion 45 rotatably supports the end portion of the cover 32 side of the shaft (the outer cylindrical portion of the output shaft 46) of the output gear 41. In addition, the angle stopper 44, the bearing portion 45, and the cover 32 may be integrally formed.

In such an output gear 41, when the output gear 41 rotates in one direction (for example, when rotating in a clockwise direction in the drawings), the output gear 41 rotates until the angle stopper 44 comes into contact with the other abutting portion 47 of the arc-shaped grooves 43.

Similarly, when the output gear 41 rotates in the other direction (for example, when rotating in a counter-clockwise direction in the drawing), the output gear 41 rotates until the angle stopper 44 comes into contact with the one abutting portion 47 of the arc-shaped groove 43. That is, the output gear 41 rotates until the angle stopper 44 comes into contact with the abutting portion 47 of each end portion of each of the arch-shaped groove 43 of the output gear By restriction of the rotational angle range of the output gear 41 using the restricting means, the rotational angle range of the rotor 1 connected to the output shaft 46 that rotates integrally with the output gear 41 is restricted. In this embodiment, the output gear 41 and the rotor 1 are adapted to integrally rotate via the output shaft 46, and the rotational angle of the rotor 1 is restricted by the above-described restricting means in the same manner as the output gear 41.

The restriction of the rotational angle of the rotor 1 is not intended to restrict the movement range of the rotational angle of the rotor 1, but is intended to perform, for example, initialization learning of a predetermined position such as the fully-closed position and the fully-open position of the coolant-control valve, based on the rotation of the rotor 1, in the control of the coolant-control valve (rotary drive device 3), for example, when manufacturing and attaching the coolant-control valve, before the start of the coolant-control valve, or when starting the operation.

In addition, in this example, the angular range of the rotor 1 restricted by the restricting means is, for example, an angular range that is slightly wider than the range between the rotational angle at which the two opening portions 25*a* and 26*a* of the above-described casing 2 side are fully-closed, and the angle at which the two openings are fully-open. That is, for example, before the output gear 41 rotates in the clockwise direction in the drawing (or in the counter-clockwise direction) and the angle stopper 44 abuts against the abutting portion 47 of the one end portion of the groove 43, for example, a predetermined fully-closed position (or a fully-open position) is obtained, and the angle stopper 44 abuts against the one abutting portion 47 of the groove 43 at the stage in which the output gear 41 rotates in the same direction to slightly exceed the predetermined fully-closed position.

That is, an angle from the center of the rotational angle range of the output gear 41 and the rotor 1 restricted by each abutting portion 47 of both ends of the groove 43 and the angle stopper 44 is wider than the angle restricted when controlling the rotor 1, by a predetermined angle. Thus, during the initialization learning, an angle, at which the abutting portions 47 at both ends of the groove 43 in the restricting means abut against the angle stopper 44 with respect to a minimum angle and a maximum angle of the rotational angle as the actual operating range of the rotor 1, becomes an angle at which the angle of abutment of the angle stopper 44 against the one abutting portion 47 is smaller than the minimum angle by a predetermined angle, and an angle at which the angle stopper 44 abuts against the other abutting portion 47 becomes an angle that is greater than the maximum angle by a predetermined angle.

For example, in the controller (control means) of the coolant-control valve, an initialization process is performed during the startup of the engine or the like. In this case, for example, the rotor 1 is rotated by the rotary drive device 3. At this time, for example, the rotor 1 is rotated to the fully-closed side to bring the angle stopper 44 into contact with one abutting portion 47 of the groove 43. The controller stores the angle obtained by adding a predetermined angle set in advance with respect to the rotational angle of the motor 33 as the contact position, for example, as the minimum angular position.

In addition, the rotor 1 is rotated to the fully-open side opposite to the fully-closed side to bring the angle stopper 44 to into contact with the abutting portion 47 of the other end portion of the groove 43. The controller stores the angle obtained by subtracting a predetermined angle set in advance with respect to the rotational angle of the motor 33 serving as the contact position, for example, as a maximum angular position. In addition, the above-described predetermined angle is stored, for example, in a storage device (for example, flash memory or EPROM) of the controller.

In the actual control, the rotational angle of the rotor 1 is controlled within the maximum angular position from the stored minimum angular position, and the rotational angle therebetween is controlled based on the minimum angular position and/or the maximum angular position. Therefore, during operation of the coolant-control valve, the control is performed so that the rotating range of the output gear 41 is shifted between the minimum angular position and the maximum angular position subjected to initialization learning as described above.

Furthermore, basically, only during initialization learning, the angle stopper 44 abuts against the abutting portion 47, and during the normal operation of the coolant-control valve, the angle stopper 44 does not come into contact with the abutting portion 47.

In such a coolant-control valve, it is possible to perform the initialization learning, using the actual angular position that is determined, by the groove 43 and the angle stopper 44 having the abutting portions 47 at both end portions of the output gear 41 as the restricting means for restricting the rotational angle of the rotor 1 via the rotary drive device 3. As a result, it is possible to exactly control the rotational angular position of the rotor 1.

Moreover, the restricting means does not regulate the rotational angle of the rotor 1, and the rotational angle of the output shaft for directly rotationally driving the rotor 1 connected to the rotor 1, but is adapted to regulate the rotational angle of the output gear 41 as the power transmission element, except the output shaft of the reduction gear 34 of the rotary drive device 3 as an actuator. Thus, there is no need for reinforcement of the rotor 1 and the output shaft, and it does not take much time for machining and assembling the rotor 1 and the output shaft.

In addition, when the configuration for restricting the rotation by abutment, that is, the configuration in which stress is generated during the rotation restriction is necessarily provided in the rotor 1 having no high strength and rigidity, or in the output shaft as a shaft with a small diameter, there is a need for reinforcement of the output shaft, the rotor 1 and the casing 2, and reinforcement of the arrangement of the high-rigidity portion and the high-strength portion to the portion subjected to stress, and thus, the size reduction and the cost reduction are difficult.

Furthermore, in this embodiment, since the restricting means is provided in the output gear 41 having the largest diameter in the reduction gear 34, even in a configuration in which stress is generated during restriction of the rotation as described above, there is no need for reinforcement, and it is possible to simplify the configuration.

In addition, as in this embodiment, in a case where the casing 2 of the coolant-control valve body side is separated from the main body 31 and the cover 32 of the rotary drive device 3, when the restricting means on the coolant-control valve body side (portion except the rotary drive device 3 of the coolant-control valve) having the rotor 1 rotationally driven by the rotary drive device 3 is provided, the twisted force is generated between the coolant-control valve body side and the rotary drive device 3 side. However, since the restricting means is provided in the rotary drive device 3 and the rotation is restricted within the rotary drive device 3, the twisted force is not generated between the coolant-control valve body side and the rotary drive device 3 side, and there is no need to reinforce the joint between the coolant-control valve body and the rotary drive device 3. Therefore, the cooling control valve can have a simple structure.

Furthermore, the above-described restricting means is constituted by the arch-shaped groove provided in the main body portion of the interior of the teeth of the output gear 41 and the angle stopper 44 fixed to the body (cover 32) side of the rotary drive device 3, and can be housed in the space approximately within the arrangement range of the output gear 41. That is, by providing the restricting means, there is no need to increase the reduction gear 34, and the easily miniaturized structure can be obtained.

Furthermore, since the output gear 41 and the rotor 1 integrally rotate via the output shaft, even when restricting the rotational angle of the rotor 1 by restricting the rotational angle of the output gear 41, an error due to the power transmission does not occur, and the high-precision control can be performed. Furthermore, for example, if the controller is connected to the rotary drive device 3, the initialization learning process can be performed even when the coolant-control valve body is not connected to the rotary drive device 3, and thus, the measurement of the angle is also possible.

The restricting means for restricting the operating range for initialization learning of control is provided in the rotary drive device 3 including the motor 33 as described above, and the configuration required for control of the motor 33 is completed in the rotary drive device 3 that does not include the coolant-control valve body having the rotor 1. Thus, it is possible to provide a simple structure, and it is possible to provide the structure that is easy to reduce the size of the coolant-control valve.

DESCRIPTION OF REFERENCE CHARACTERS

1 rotor (valve body)
2 casing
3 rotary drive device (actuator)
33 motor
34 reduction gear
41 output gear (power transmission element)
43 groove (restricting means)
44 angle stopper (restricting means)
46 output shaft
47 abutting portion

What is claimed is:
1. A coolant-control valve comprising:
a valve body that is driven to control a flow rate of coolant for cooling an engine;
a casing that houses the valve body;
an actuator that rotationally operates the valve body, the actuator including a motor and a reduction gear that decelerates rotation of the motor, the reduction gear including a plurality of power transmission elements, the plurality of power transmission elements including a gear, the gear including an arch-shaped groove centered on a rotation center of the gear;
an angle stopper that is inserted into the groove and fixed to a body inside which the actuator is provided, a rotational angle range of the gear is restricted by abutment of the angle stopper against each of two end portions of the groove; and
control means for controlling the actuator and for performing an initialization process that determines a rotational angle range of the valve body based on the restricted rotational angle range of the gear.
2. The coolant-control valve according to claim 1, wherein the gear is an output gear that rotates the valve body via an output shaft that is configured to transmit power to the valve body.
3. A coolant-control valve comprising:
a valve body that is driven to control a flow rate of a coolant;

an actuator that rotationally operates the valve body, the actuator including a motor and a reduction gear that decelerates rotation of the motor;

an output shaft configured to transmit power to the valve body;

an output gear that rotates the valve body via the output shaft, the output gear including an arch-shaped groove that is centered on a rotation center of the output gear;

an angle stopper that is inserted into the groove and fixed to a body inside which the actuator is provided, a rotational angle range of the output gear being restricted in both a clockwise direction and a counterclockwise direction by abutment of the angle stopper against each of two end portions of the groove; and a controller configured to control a rotational angle range of the valve body based on the restricted rotational angle range of the output gear.

4. The coolant-control valve according to claim 3, wherein the controller, during a startup of an engine, performs an initialization process that includes:

rotating the output gear in the clockwise direction until the angle stopper abuts a first end portion of the groove and storing a first angular position; and rotating the output gear in the counterclockwise direction until the angle stopper abuts a second end portion of the groove and storing a second angular position.

5. The coolant-control valve according to claim 4, wherein, during normal operation of the engine, the controller controls the rotational angle range of the valve body within a range between the first angular position and the second angular position.

6. The coolant-control valve according to claim 5, wherein the controller rotates the output gear in the clockwise direction until the angle stopper abuts the first end portion of the groove and rotates the output gear in the counterclockwise direction until the angle stopper abuts the second end portion of the groove only during the initialization process and not during normal operation of the engine.

7. A vehicle comprising:

an engine; and the coolant-control valve according to claim 3 configured to provide the coolant to the engine.

* * * * *